UNITED STATES PATENT OFFICE.

FRANS GUSTAF ABEL PROBERG, OF EMPORIUM, PENNSYLVANIA, ASSIGNOR OF ONE-HALF TO DAVID LUNDY WILDRICK, OF DOVER, NEW JERSEY.

EXPLOSIVE COMPOUND.

SPECIFICATION forming part of Letters Patent No. 540,141, dated May 28, 1895.

Application filed October 1, 1894. Serial No. 524,651. (No specimens.)

*To all whom it may concern:*

Be it known that I, FRANS GUSTAF ABEL BROBERG, a subject of the Swedish King, but who have declared my intention of becoming a citizen of the United States, residing at Emporium, in the county of Cameron and State of Pennsylvania, have invented certain new and useful Improvements in Explosive Compounds; and I do hereby declare the following to be a full, clear, and exact description of the invention, such as will enable others skilled in the art to which it appertains to make and use the same.

My invention relates to improvements in explosive compounds, and it consists essentially in the product formed by mixing together nitro-rosin, nitro-naphthalenes, sulfur, and an oxidizing agent.

The nitro rosin is prepared by treating ordinary rosin with nitric acid, or with a mixture of nitric and sulfuric acids. If weak acids are used heat should be applied. Should strong acids be used, the acids should be poured into the vessel containing the rosin only a little at a time to prevent too violent a reaction, and, when nitro-sulfuric acid is used, the charring of the rosin. This product after being thoroughly washed to remove the free acid, is mixed with nitro-naphthalenes, or the rosin and the naphthalene may be mixed together before the nitration and both treated together with the acid in the same vessel. To this mixture of nitro-rosin and nitro-naphthalenes I add sulfur, and an oxidizing agent, preferably nitrate of soda, then mix the mass up well, and subject the mixture to sufficient heat to melt the sulfur and the nitro-compounds. The semi-solid mass is made into the granular form preferably by forcing it through a screen and breaking up the cooled pencil-like lengths so formed. However, I do not limit myself to this process of producing the grains.

The proportions of the various ingredients may be varied within wide limits, and the nitro-naphthalenes may be partly omitted if desired, increasing instead the percentage of the nitro-rosin, or vice-versa.

I have found the three following mixtures to give good results:

First. Nitro-rosin, eight per cent.; nitro-naphthalenes, eight per cent.; sulfur, fourteen per cent.; nitrate of soda, seventy per cent.

Second. Nitro-rosin, ten per cent.; nitro-naphthalenes, five per cent.; sulfur, fifteen per cent.; nitrate of soda, seventy per cent.

Third. Nitro-rosin, six per cent.; nitro-naphthalenes, ten per cent.; sulfur, fourteen per cent.; nitrate of soda, seventy per cent.

The nitro-rosin and also the nitro-naphthalenes will form a sort of shellac-like coating on the grains or particles of the nitrate of soda, and will thus to a large degree, prevent the absorption of moisture by the nitrate of soda from the atmosphere, to the deterioration of the explosive.

Having thus described my invention, what I claim, and desire to secure by Letters Patent of the United States, is—

1. As a composition of matter, an explosive compound consisting of nitro-rosin, nitro-naphthalenes, sulfur, and an oxidizing agent.

2. As a composition of matter, an explosive compound consisting of nitro-rosin, nitro-naphthalenes, sulfur, and nitrate of soda.

In testimony whereof I affix my signature in presence of two witnesses.

FRANS GUSTAF ABEL BROBERG.

Witnesses:
 MICHAEL BRENNAN,
 JOHN M. KING.